United States Patent [19]

Jones

[11] Patent Number: 4,789,365
[45] Date of Patent: Dec. 6, 1988

[54] AQUACYCLE

[76] Inventor: Jeffrey K. Jones, 1861 SE. 148th Ave., Portland, Oreg. 97233

[21] Appl. No.: 40,036

[22] Filed: Apr. 20, 1987

[51] Int. Cl.$^4$ .............................. B60F 0/3; B63H 6/12
[52] U.S. Cl. ...................................... 440/21; 440/30; 440/28
[58] Field of Search .................. 440/11, 12, 26–30, 440/21, 80; 464/51, 52

[56] References Cited

U.S. PATENT DOCUMENTS

| | | | |
|---|---|---|---|
| 643,678 | 2/1900 | Perry | 440/12 |
| 3,185,125 | 5/1965 | Haman | 440/31 |
| 3,248,970 | 5/1966 | Pickles | 464/52 |
| 4,092,945 | 6/1978 | Aukert et al. | 114/270 |
| 4,285,764 | 8/1981 | Salvai | 162/132 |
| 4,323,352 | 4/1982 | Warren et al. | 440/27 |
| 4,493,657 | 1/1985 | Zeitler | 440/27 |
| 4,576,580 | 3/1986 | Gulko | 440/21 |

FOREIGN PATENT DOCUMENTS

| | | | |
|---|---|---|---|
| 514927 | 2/1955 | Italy | 440/12 |
| 177743 | 4/1922 | United Kingdom | 440/12 |

Primary Examiner—Joseph F. Peters, Jr.
Assistant Examiner—Edwin L. Swinehart
Attorney, Agent, or Firm—Kolisch, Hartwell & Dickinson

[57] ABSTRACT

Apparatus for converting a bicycle to a maneuverable, pedal-operable aquacycle is disclosed. A twin hull assembly includes a support framework for supporting a bicycle by its horizontal frame member. A friction wheel, which may be rotated with the rear wheel of the bicycle by pedal action, turns symmetrically spaced apart, oppositely pitched, twin propellers via dual flexible axles that extend laterally and rearwardly from the friction wheel. An in-line dual rudder control system is provided that, responsive to the turning of the handlebars, efficiently turns the aquacycle in a direction corresponding to the direction a bicycle would turn. Except for conversion hardware consisting of two U-bolts and four nuts, the apparatus is of lightweight, polymeric materials.

7 Claims, 2 Drawing Sheets

AQUACYCLE

BACKGROUND AND SUMMARY OF THE INVENTION

This invention relates generally to aquacycles, and more particularly to apparatus for conversion of a bicycle into a buoyant, maneuverable, pedal-operable aquacycle.

Pedal operated flotation devices are well-known They provide, for one or more riders, a buoyant hull assembly, pedal operated propulsion means, e.g. a paddle wheel or a propeller, and steering control, e.g. a rudder. Most are intended for recreational purposes, and provide minimal, and frequently inefficient, propulsion. Typically, such recreational water craft are offered for rental only, and then only in a resort setting.

Amphibious craft which are pedal operable on land and water are not unheard of, but require much time and effort to convert, and compromise their efficient operation on land, water or both. Bulky hardware and tools burden the operator of such amphibious craft, and become undesirable ballast for both the rider of the bike and the driver of the boat. Depending upon the design of the conversion kit, the efficiency with which one operates the bicycle on land, or the boat in water, may be impaired. For example, frame supporting members that connect the bicycle to the hull assembly may require the removal of a fender, a kickstand, or other accessories. Conversely, if left installed, such bicycle accessories may interfere with operation of the water craft. Often, adaptive structures themselves cause damage to the bicycle, e.g. bent spokes result, by use of the front wheel of the bicycle to control the rudder of the boat, from wedging a rudder control arm therebetween.

The design of aquacycle conversion kits frequently ignores the limitations of the bicycle and its rider, or ignores the requirements of the aquacycle and its driver. A propeller meets more frictional resistance when turning in water than does a wheel when rolling on pavement Thus, the torque required to propel a water craft is greater than that required to propel a bicycle. When the full weight of the driver of the aquacycle is borne by a propeller driving friction wheel, the aquacycle becomes difficult to operate. When the friction wheel is disposed beneath the rear wheel of the bicycle to rotate in the plane thereof, the 90° angle through which the rotation must be translated to propel the water craft forward is thought to require a heavy, complex and costly gear train Frequently, the propeller is offset by the gear train from the center line of the aquacycle, resulting in asymmetric forward thrust Finally, rudder control systems associated with the front wheel of the bicycle sometimes produce steering of the water craft in a direction opposite the turning of the handlebars, a most unnatural and undesirable result.

One such water cycle conversion device is disclosed in U.S. Pat. No. 4,493,657. In addition to suffering most of the drawbacks described above, the device described therein supports a bicycle by a base framework including a square pipe joined near the pedal hub to one of the inclined lower frame members. While relatively simple, this support arrangement places significant stress on both the bicycle frame and the hull assembly to which the square pipe is secured. In the operation of an aquacycle, significant lateral forces tend to urge a bicycle and its rider toward the left and toward the right as the pedals are operated By securing the frame of the bicycle well below its center of gravity, the device is inefficient in overcoming the normal torsional forces incident upon the hull assembly and its bicycle support frame work, causing undue stress and the risk of premature failure.

For the serious amphibious craft enthusiast, durability, maneuverability and convertibility of the aquacycle are musts. A means of vertically stabilizing and supporting the bicycle above the hull assembly must be provided that, while resisting lateral movement of the bicycle and its rider, does not unduly stress or damage the bicycle or the hull assembly. Adequate propulsion must be produced in response to effort expended by the driver of the aquacycle. When the driver turns the handlebars to the right, the aquacycle should turn port (right); when the driver turns the handlebars to the left, the aquacycle should turn starboard (left). Finally, when an afternoon of aquatic work or pleasure is over, conversion of the aquacycle back into a bicycle should not take longer than the ride home.

Accordingly, it is an object of this invention to provide aquacycle conversion apparatus that transforms a bicycle into a maneuverable, pedal-operable aquacycle.

Another object is to provide apparatus that enables the quick and easy transformation of a bicycle to an aquacycle and vice versa.

A further object is to provide an aquacycle that provides ample, even, forward thrust.

Yet another object of the invention is to provide an aquacycle, the steering of which feels natural to the rider of a bicycle.

According to the preferred embodiment of the invention, aquacycle conversion apparatus includes a twin hull assembly, and a bicycle support framework mounted thereon and capable of supporting and vertically stabilizing a bicycle by the bicycle's horizontal high frame member, i.e. a frame member located well above the bicycle's center of gravity. A forward frame member extending between the laterally spaced floats of the twin hull assembly includes a rudder control arm pivotally mounted thereon The arm has opposite ends radiating from the mount, and a transversely mounted concave wheel well extending upwardly therefrom. The wheel well is dimensioned to receive the lower portion of the front wheel of the bicycle such that pivotal movement of the front wheel of the bicycle, when received in the well, results in one-to-one pivotal movement of the arm.

A rear frame member, similarly disposed between twin hulls, provides structural support for a twin screw propulsion system and the remainder of the rudder control system The propulsion system includes a friction wheel that rotates with the rear wheel of the bicycle by pedal action and that rotates, in turn, dual flexible axles that drive oppositely threaded and pitched, laterally spaced propellers. The propellers rotate in bearings mounted below, and rearwardly of the rear frame member, and provide, in operation, substantial, symmetrical forward thrust.

Behind each propeller is a rudder, pivotable upon a generally vertical shaft that rotates within a bearing assembly also mounted to the rear frame member. A pulley, mounted atop each shaft, is pivoted, under control of the rudder control arm, via a cable extending between opposite ends thereof, and around and operatively engaging the two pulleys. The cable is routed through the two pulleys in a manner enabling same-direction pivoting of the two rudders in a direction opposite to that of the front wheel, which is turned, conventionally, by the handlebars.

By supporting the bicycle above and between the twin hulls, the support framework prevents the entire weight of the bicycle and its rider from bearing on either the front wheel well part of the rudder control arm or the friction wheel part of the propulsion system This novel feature makes it possible for the driver of the aquacycle to pedal operate the propellers without undue strain, even when the bicycle is in high gear. By the placement of the dual rudders in line with the twin propellers, turning efficiency is increased. The conversion apparatus is made primarily of polyvinyl chloride (PVC) tubing and fittings, and conversion from bicycle to aquacycle requires U-bolts, a tightening tool, and a few moment's time.

These and other advantages and features of the invention will become more fully apparent when the detailed description below is read with reference to the accompanying drawings.

DETAILED DESCRIPTION OF THE PREFERRED EMBODIMENT

Figure 1:
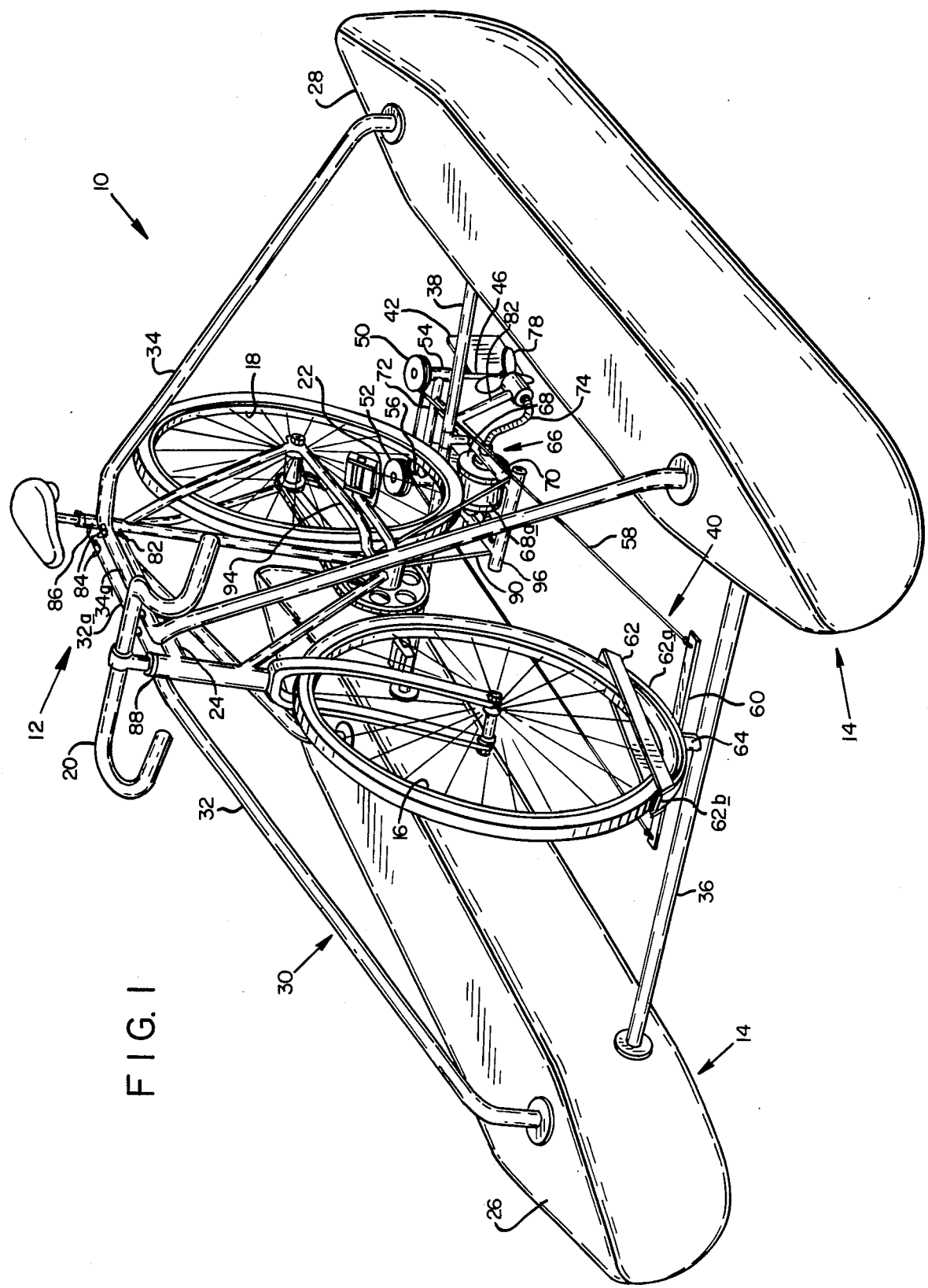
FIG. 1 is a perspective view of the aquacycle proposed by the present invention.

FIG. 1 shows the aquacycle of the present invention, in its preferred embodiment, generally at 10. Aquacycle 10 is an assembly including a bicycle, indicated generally at 12, and aquacycle conversion apparatus, which will be understood to include everything shown in FIG. 1 except bicycle 12.

Fully assembled bicycle 12 is conventional, including a handlebar steerable front wheel 16, and a pedal operable rear wheel 18. It will be understood that by turning handlebars 20 to the left, or pivoting them counterclockwise, front wheel 16 turns to the left, or pivots counterclockwise. It will also be understood that by the forward rotation of pedal assembly 22, rear wheel 18 undergoes forward rotation Bicycle 12 may be equipped with various standard accessories, e.g. brakes, gears, fenders, kickstand, (not shown for the sake of clarity) without interfering with the structure or operation of aquacycle 10. Importantly, generally horizontal frame member 24, referred to herein as a high frame member, is located significantly above the center of gravity of bicycle 12. As will be seen below, in reference to FIG. 2, high frame member 24 provides for the vertical stabilization and support of bicycle 12 above hull assembly 14.

In the preferred embodiment of the invention, buoyant hull assembly 14 includes laterally spaced twin hulls, or floats, 26, 28, which are dimensioned to displace sufficient water by volume to support aquacycle 10 and its driver (not shown) and further includes forward and rearward frame members 36, 38. Floats 26, 28 are positioned in generally parallel relationship with one another, and are laterally spaced sufficiently to provide a horizontally stable, yet maneuverable, watercraft. Through experimentation, it has been determined that aquacycle 10 may be built to the following overall dimensions: 6' wide by 8' long by 4' high, and with a draft of approximately 4 to 8" (depending upon the weight of the driver). These dimensions provide approximately a 400 lb. capacity for bicycle and driver. Preferably, floats 26, 28 are made of lightweight material, e.g. polystyrene or polyethylene.

Extending upwardly and laterally inwardly from hull assembly 14 is a bicycle support framework, indicated generally at 30. Framework 30 may be thought of as an A-frame, or pyramid, assembly that includes dual, mirror image, trapezoidal-shaped members 32, 34 that meet at an apex adjacent bicycle frame member 24. The four-cornered, rectangular base of pyramidal framework 30 is rigidly mounted by any appropriate means at or near the tops of floats 26, 28. In the preferred embodiment, framework 30 is made of 1½" diameter PVC, although other materials, e.g. aluminum, may be used. Members 32, 34 include mating horizontal regions 32a, 34a, respectively, disposed generally coaxially with bicycle frame member 24 By means that will be described below, in reference to FIG. 2, members 32, 34 thereby rigidly support bicycle 12 along an axis well above its center of gravity, importantly providing flexibly rigid resistance to lateral movement of bicycle 12 during the operation of aquacycle 10.

By the novel arrangement of bicycle support framework 30, a bicycle, such as that shown at 12, may be clampingly embraced at its horizontal frame member 24, thus supporting the substantial weight of the bicycle and its rider in a centered position above and between floats 26, 28. It will be appreciated that, within the spirit of the invention, hull assembly 14 may be unitary, rather than consisting of spaced apart floats 26, 28. In such event, the material strength of unitary hull assembly 14 would serve to overcome the tendency of the weight of bicycle 12 and its rider laterally to force twin hulls 26, 28 apart. In the preferred embodiment of the invention, wherein twin hulls are used, forward and rearward frame members 36, 38 serve this purpose, thus cooperating with floats 26, 28 to complete hull assembly 14.

It will be appreciated that, without more, a buoyant watercraft has now been described, which, although not yet pedal operable or maneuverable, is light in weight, ye of great durability. By the inherent strength of the arrangement of twin hull assembly 14 and bicycle support framework 30, an unprecedented strength to weight ratio has been achieved in a buoyant, bicycle supporting structure.

Still referring to FIG. 1, a novel rudder control system indicated generally at 40 will be described. Rudder control system 40 is mounted on hull assembly 14, and more specifically on forward and rearward frame members 36, 38. Rudder control system 40 includes a pair of laterally spaced rudders 42, 44, which are located rearwardly of and generally in line with a pair of propellers, to be described below Rudders 42, 44, are mounted on, and pivotable with, generally vertical shafts 46, 48 having pulleys 50, 52 mounted thereon (refer to FIG. 2). As will be seen, the pivoting of shafts 46, 48, within housings 54, 56, is facilitated by a ball bearing assembly, press fitted, with reduction, into the housings Pulleys 50, 52 have channels 50a, 52a, respectively therein, for capturedly receiving a length of cable 58 in a manner to be described.

Forward frame member 36 has pivotably mounted thereon a rudder control arm 60, and mounted transversely therewith a concave wheel well 62, which is shaped and dimensioned to cradle the front wheel of bicycle 12. Wheel well 62, which pivots with rudder control arm 60, responsive to the pivoting of handlebars 20, is rigidly disposed generally perpendicular to control arm 60, resulting in generally one-to-one pivotal movement of control arm 60 in response to corresponding pivotal movement of handlebars 20.

In the preferred embodiment, wheel well 62 includes arcuate section 62a and rectangular opening 62b through which the front wheel of bicycle 12 extends. Opening 62b describes, in lateral view, a chord of the circle described by front wheel 16. Control arm 60 and wheel well 62 are pivotally mounted on forward frame member 36 via shaft 64, which is oriented generally coaxially with steering column 88 and which preferably contains a ball bearing assembly (not shown). It will be seen that this novel structure permits controllable, one-to-one pivotal movement of rudder control arm 60, unimpeded by the weight of the driver.

Front wheel 16 will be seen as being cradled by, rather than affixed to, wheel well 62, providing important advantages. First, no hardware is required to operatively associate front wheels 16 with rudder control system 40, thus making conversion from bicycle to aquacycle, and from aquacycle to bicycle, quick, simple and straight-forward. Second, no damage results to front wheel 16, as would occur if, for example, control arm 60 extended transversely through, and were affixed to, the spokes of front wheel 16. By virtue of the novel bicycle support framework 30, front wheel 16 of bicycle 12 bears an insignificant fraction of the weight of either bicycle 12 or the driver, thus minimizing friction that would otherwise have to be overcome in the operation of rudder control system 40.

Extending rearwardly from either end of control arm 60 is continuous cable 58, which operatively engages pulleys 50, 52 to effect pivotal movement of rudders 42, 44 in response to pivotal movement of control arm 60. The routing of cable 58 around pulleys 50, 52 and through channels 50a, 52a in the manner shown in FIGS. 1 and 2, imparts same-direction, pivotal movement of the rudders in response to pivotal movement of the front wheel of the bicycle. It will be noted that cable 58 is provided with a flange (not shown) on either side of each channel, to prevent slippage of cable 58 relative to pulleys 50, 52, in a manner that is well-known.

Figure 2:
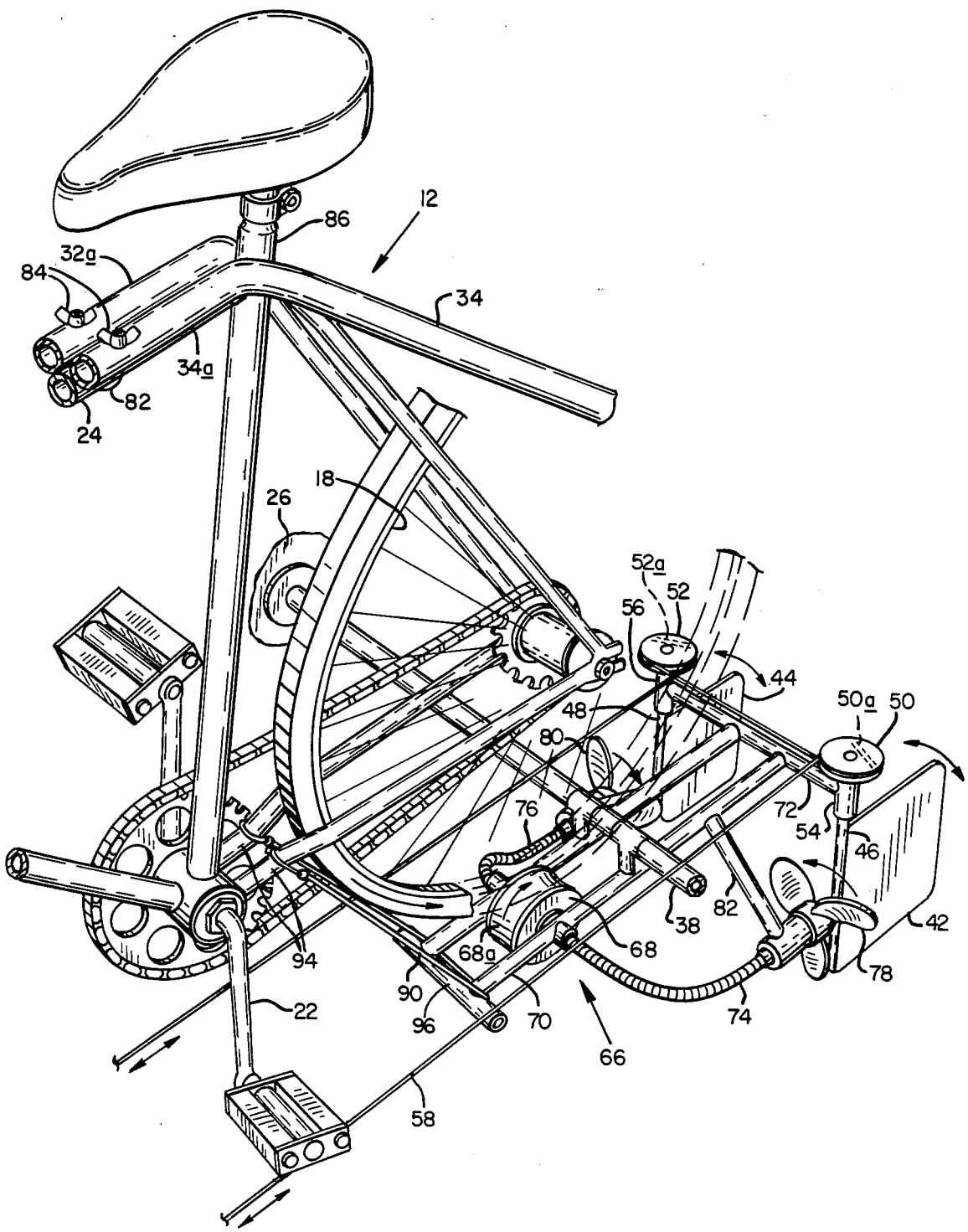
FIG. 2 is a fragmentary, perspective view of the preferred embodiment of the invention, showing support framework, propulsion system and rudder control system detail

Referring now to FIGS. 1 and 2, a novel propulsion system, indicated generally at 66, will be described. Propulsion system 66 includes a friction wheel 68, rotatably mounted on a lever arm 70 and preferably with a ball bearing assembly (not shown). Friction wheel 68 is disposed directly under, for frictional rotation with, rear wheel 18 of bicycle 12. Lever arm 70 depends slightly from, and extends forwardly and rearwardly of, rear frame member 38, supporting friction wheel 68 in front thereof and supporting previously described pulley shafts 46, 48, via first crossbar 72, therebehind.

It will be noted from FIG. 2 that the surface of friction wheel 68 that frictionally engages rear wheel 18 of bicycle 12 is, in the preferred embodiment, concave That is, the diameter of generally cylindrical friction wheel 68 increases toward the outer, planar-circular ends. This provides the distinct advantage that friction wheel 68 better tracks rear wheel 18. In the preferred embodiment, friction wheel 68 is a turned steel hub with a center portion of uniform cylindrical shape having on either side a thick, greater diameter, cylindrical end plate The circumferential channel formed between the end plates is wrapped with multiple layers of rubber to provide a long wear, friction promoting, mating surface 68a.

Oppositely threadedly connected to friction wheel 68, and extending laterally and rearwardly on either side thereof, and rotatable therewith, are dual flexible axles 74, 76. The construction of axles 74, 76 has been found to be of critical importance to the operation of propulsion system 66. In the preferred embodiment, axles 74, 76 consist of a ½" ID hydraulic hose with a ¼" OD cable, e.g. 100-R2 ¼", threaded therethrough. The hydraulic cable is preferably of rubber over wire mesh, or wire-impregnated construction. This construction has been found to provide the needed rigidity (to prevent buckling), flexibility (to permit rotation) and durability (to prevent damage) under environmental and operational stress.

Axles 74, 76 rotatably drive a pair of laterally spaced, oppositely threaded and pitched propellers 78, 80, which are rotatably mounted, preferably within a ball or sleeve bearing assembly (not shown), to lever arm 70 through depending, laterally inclined struts 82, 84. Struts 82, 84 locate propellers 78, 80 generally in line with rudders 42, 44, providing maximum steering efficiency In the preferred embodiment, propellers 78, 80 are #12 pitch, are of 10" diameter and extend a few inches below the bottom of floats 26, 28. It will be appreciated by those skilled in the art that diameter, pitch and draft of propellers 78, 80 may be varied somewhat to achieve the desired thrust. It has been found effective to position and dimension struts 82, 84 so that propellers 78, 80 are fully submersible in water.

As best illustrated in FIG. 2, dual propellers 78, 80 are generally in line with dual rudders 42, 44. This alignment of propeller and rudder, well-known in marine vessels to provide increased steering efficiency, provides aquacycle 10 with unprecedented maneuverability. It has been found that the turning radius of an aquacycle with an in-line rudder and propeller system is approximately one-half that of aquacycles without. It is believed to be the velocity of the propelled water on either side of the rudder that provides this mechanical advantage.

Referring still to FIG. 2, the sole means of securing bicycle 12 to the conversion apparatus of the present invention will now be described. With regions 32a, 34a of trapezoidal frame members 32, 34, respectively, abutted in generally coextensive, parallel relationship with one another and with high frame member 24 of bicycle 12, two U-bolts, such as 82, and four wing nuts, such as 84, are installed so that member 24 is clampingly embraced thereby. U-bolt 82 is first threaded through vertical holes drilled through corresponding, rearward locations of region 32a, 34a in such manner that frame member 24 is trapped within the base of U-bolt 82. Wing nuts 84 are threaded then onto the shanks of U-bolt 82 and tightened against regions 32a, 34a. By similar means, and in similar fashion, a second U-bolt and associated wing nuts are installed through holes drilled adjacent the forward end of regions 32a, 34a (refer to FIG. 1). It will be appreciated that, within the spirit of the invention, a bicycle lacking such a high frame member may be similarly secured, by an alternate arrangement of U-bolts around forward and rearward vertical frame members, such as seat column 86 and steering column 88 of bicycle 12.

As is clear from FIG. 2, bicycle 12 is not rigidly connected to propulsion system 66 Rather, by virtue of support framework 30, rear wheel 18 of bicycle 12 is supported directly above wheel 68 of propulsion system 66, for operative engagement therewith. In converting the bicycle to an aquacycle, it will be appreciated that the only connection between bicycle 12 and propulsion system 66 is resilient cord 90, which is preferably a woven, elastic cord with a C-shaped hook on either end for engaging a bicycle frame member 94 and a second crossbar 96, as shown. Obviously, cord 90 may be easily installed, removed and carried, and provides a nonstressful and nondamaging means by which, during the first few pedal cycles, friction wheel 68 is urged into frictional engagement with rear wheel 18.

It will be appreciated that resilient cord 90 is required only at the beginning of the operation of aquacycle 10. This is because, by the structure and orientation of lever arm 70 within propulsion system 66, thrust from dual propellers 78, 80 urges wheel 68 into continuous frictional engagement with rear wheel 18. In other words, normal propulsion produces torque generally about the axis of rear frame member 38 that tends to urge wheel 68 in an upward direction toward rear wheel 18. The PVC material from which structural members 38, 70 are made provides the needed flex to take advantage of this torque.

As should be apparent, neither rudder control system 40 nor propulsion system 66 bears a significant fraction of the weight of either bicycle 12 or the driver This important feature of the present invention facilitates both steering and propulsion of aquacycle 10, and renders the aquacycle as easily operated as a bicycle It will be understood that bicycle 12 may be equipped with high, low or other gears therebetween, e.g. it may be a ten-speed bicycle, yet, because the weight of its rider does not bear on propulsion system 66, pedal assembly 22 is easy to operate This has been found to be true even when such a bicycle is operated in high gear. It will be further appreciated that the pivoting of handlebars 20 results in substantially one-to-one pivotal movement of control arm 60, and, via cable 58 and pulleys 50, 52, results in same-direction pivotal movement of rudders 42, 44 in the opposite direction of the pivotal movement of the handlebars. Thus, the most natural steering of aquacycle 10 is provided: the same right-left steering as that of a bicycle.

The advantages of the present invention should be readily apparent In its preferred embodiment, the invention provides a highly durable and maneuverable aquacycle, the conversion to and from a bicycle of which may be accomplished with a minimum of hardware, tools and time. The aquacycle conversion apparatus, consisting of a twin hull assembly, a bicycle support framework, a rudder control system and a dual propulsion system, is light in weight and easily portable It will be appreciated that, within the spirit of the invention, certain frame members may be hingedly or otherwise collapsibly modified to provide ultra lightweight and compact, towable aquacycle conversion apparatus.

Accordingly, while a preferred embodiment of the invention has been described herein, it is appreciated that further modifications are possible that come within the scope of the invention.

It is claimed and desired to secure by Letters Patent:

1. Apparatus for converting a bicycle into a maneuverable, pedal-operable aquacycle comprising:

a buoyant twin hull assembly comprising a pair of laterally spaced floats rigidly connected to one another by forward and rearward frame members extending therebetween;

a bicycle support framework mounted on the hull assembly and extending upwardly and laterally inwardly therefrom for supporting and vertically stabilizing the bicycle, the framework including a generally horizontal portion clampingly embracing a generally horizontal high frame member of the bicycle, whereby the substantial weight of the bicycle is borne at the frame member by the framework and the hull assembly;

the forward frame member having pivotally mounted thereon a rudder control arm having oppositely radiating ends, the arm further having transversely and upwardly extending therefrom a concave wheel well dimensioned to receive a lower portion of the front wheel of the bicycle in such manner that pivotal movement of the front wheel of the bicycle, when so received in the well, results in substantially one-to-one pivotal movement of the arm;

the rearward frame member having mounted thereon a twin propeller propulsion system including a friction wheel rotatable with the rear wheel of the bicycle, when the bicycle is supported by the framework, by pedal action, the propulsion system further including dual flexible axles operatively connected to the friction wheel, extending laterally and rearwardly on either side thereof and being rotatable therewith, and a pair of laterally spaced, oppositely pitched propellers, each being substantially rigidly positionable relative to the rearward frame member and each being mounted for rotation with the friction wheel on a corresponding one of the axles, the friction wheel, the dual flexible axles and the oppositely pitched propellers cooperating to provide dual propeller substantially horizontal forward thrust in response to pedal operated forward rotation of the rear wheel of the bicycle, the rearward frame member further having mounted thereon a twin rudder system including a pair of laterally spaced rudders located rearwardly of and generally in line with the propeller pair, each of the rudders being mounted on and pivotable with a generally vertical shaft having a pulley thereon; and a rudder control cable extending rearwardly from one of the opposite ends of the arm, around and operatively engaging the pulleys of the dual rudder system, and extending forwardly therefrom to the other of the opposite ends of the arm, the cable imparting same-direction pivotal movement to the shafts in response to and in the opposite direction of pivotal movement of the arm.

2. Apparatus for converting a bicycle into a maneuverable, pedal-operable aquacycle comprising:

a buoyant twin hull assembly comprising a pair of laterally spaced floats rigidly connected to one another by forward and rearward frame members extending therebetween;

a bicycle support framework mounted on the hull assembly and extending upwardly and laterally inwardly therefrom for supporting and vertically stabilizing the bicycle, the framework including a generally horizontal portion for clampingly embracing a generally horizontal high frame member of the bicycle at plural points therealong at least two of which are adjacent the front and rear ends of the frame member, whereby the substantial weight of the bicycle is borne at such points along the frame member by the framework and the hull assembly;

the forward frame member having pivotally mounted thereon a rudder control arm having oppositely radiating ends, the arm further having transversely and upwardly extending therefrom a concave wheel well dimensioned to receive a lower portion of the front wheel of the bicycle in such manner that pivotal movement of the front wheel of the bicycle, when so received in the well, results in substantially one-to-one pivotal movement of the arm;

the rearward frame member having mounted thereon a twin propeller propulsion system including a friction wheel rotatable with the rear wheel of the bicycle, when the bicycle is supported by the framework, by pedal action, the friction wheel being rotatable about a first axis, the rear wheel being rotatable about a second axis which is substantially parallel with the first axis, the first and second axes generally defining a substantially vertical plane, the propulsion system further including dual flexible axles operatively connected to the friction wheel, extending laterally and rearwardly on either side thereof and being rotatable therewith, and a pair of laterally spaced, oppositely pitched propellers, each being substantially rigidly positionable relative to the rearward frame member and each being substantially rigidly positionable relative to the rearward frame member and each being mounted, for rotation about an axis which is generally normal to the substantially vertical plane, on a corresponding one of the axles, the friction wheel, the dual flexible axles and the oppositely pitched propellers cooperating to providing dual propeller substantially horizontal forward thrust in response to pedal operated forward rotation of the rear wheel of the bicycle, the rearward frame member rotatably mounting the propellers and the friction wheel in such relative position that, forward thrust from the propellers urges the friction wheel upwardly toward the rear wheel of the bicycle, thereby increasing the frictional engagement therebetween.

3. An improved pedal-operable aquacycle including a bicycle having handlebars and a front wheel pivotable therewith, a pedal-operable rear wheel, and a frame including a generally horizontal high frame member, and including a buoyant hull assembly, and having a rudder control system associated with the front wheel, and a propulsion system associated with the rear wheel, an improvement comprising:

a bicycle support framework mounted on the hull assembly and extending upwardly and laterally inwardly therefrom for supporting and vertically stabilizing the bicycle, the framework including a generally horizontal portion for clampingly embracing the generally horizontal high frame member of the bicycle, whereby the substantial weight of the bicycle is borne at the frame member by the framework and the hull assembly;

the propulsion system being mounted on the hull assembly and including a friction wheel rotatable with the rear wheel of the bicycle by pedal action, dual flexible axles operatively connected to the friction wheel, extending laterally and rearwardly on either side thereof and being rotatable therewith, and a pair of laterally spaced, oppositely pitched propellers, each being substantially rigidly positionable relative to the hull assembly and each being mounted for rotation with the friction wheel on a corresponding one of the axles, the friction wheel, the dual flexible axles and the oppositely pitched propellers cooperating to provide dual propeller substantially horizontal forward thrust in response to pedal operated forward rotation of the rear wheel of the bicycle; and the rudder control system being mounted on the hull assembly and including a pair of laterally spaced rudders located rearwardly of and generally in line with the propeller pair, each of the rudders being mounted on and pivotable with a generally vertical shaft having a pulley fixedly mounted thereon, a rudder control arm pivotable with the front wheel of the bicycle, the arm including a concave wheel well cradling the front wheel of the bicycle, and a rudder control cable extending rearwardly from one of the opposite ends of the arm, around and operatively engaging the pulleys and extending therefrom forwardly to the other of the opposite ends of the arm, the cable imparting generally equal, same-direction pivotal movement of the pulleys in response to and in the opposite direction of pivotal movement of the handlebars of the bicycle.

4. The improved aquacycle of claim 3, wherein the friction wheel and the rear wheel of the bicycle lie generally in the same plane, the circumferentially mating surface of the friction wheel being concave and including means for promoting friction between the friction wheel and the rear wheel of the bicycle.

5. The aquacycle of claim 3, wherein the buoyant hull assembly comprises a pair of laterally spaced floats rigidly connected by forward and rearward frame members, the rearward frame member substantially rigidly mounting, for rotation with the rear wheel of the bicycle, the propellers and the friction wheel in such relative position that, in operation, forward thrust from the propellers urges the friction wheel upwardly into frictional engagement with the rear wheel of the bicycle.

6. The aquacycle of claim 3, wherein the buoyant hull assembly comprises a pair of laterally spaced floats rigidly connected by a forward and a rearward frame member, and wherein the rudder control arm is pivotally mounted on and extends upwardly from the forward frame member, the wheel well being shaped and dimensioned generally to conform along its extent to the front wheel of the bicycle, the wheel well having a depth sufficient to enable substantially one-to-one pivotal movement of the arm in response to pivotal movement of the handlebars of the bicycle.

7. The aquacycle of claim 6, wherein the wheel well includes a rectangular opening through which the front wheel of the bicycle extends, the opening describing, in lateral view, a chord of the circle described by the front wheel.

* * * * *